United States Patent
Wada (10) Patent No.: US 10,113,514 B2
(45) Date of Patent: Oct. 30, 2018

(54) VALVE DEVICE

(71) Applicant: NIFCO INC., Yokosuka-shi, Kanagawa (JP)

(72) Inventor: Toshio Wada, Yokosuka (JP)

(73) Assignee: NIFCO INC., Yokosuka-Shi, Kanagawa (JP)

(*) Notice: Subject to any disclaimer, the term of this patent is extended or adjusted under 35 U.S.C. 154(b) by 0 days.

(21) Appl. No.: 15/309,841

(22) PCT Filed: Apr. 24, 2015

(86) PCT No.: PCT/JP2015/062584
§ 371 (c)(1),
(2) Date: Nov. 9, 2016

(87) PCT Pub. No.: WO2015/170621
PCT Pub. Date: Nov. 12, 2015

(65) Prior Publication Data
US 2017/0138316 A1 May 18, 2017

(30) Foreign Application Priority Data

May 9, 2014 (JP) ................................. 2014-097413
Jan. 15, 2015 (JP) ................................. 2015-006043

(51) Int. Cl.
*F02M 25/08* (2006.01)
*B60K 15/035* (2006.01)
(Continued)

(52) U.S. Cl.
CPC ....... *F02M 25/0836* (2013.01); *B60K 15/035* (2013.01); *B60K 15/03519* (2013.01);
(Continued)

(58) Field of Classification Search
CPC .............. F16K 27/0209; F16K 15/021; B60K 15/03519; B60K 15/035; F02M 25/0836
(Continued)

(56) References Cited

U.S. PATENT DOCUMENTS

| 4,886,089 A | 12/1989 | Gabrlik et al. |
| 5,090,459 A * | 2/1992 | Aoki .................... B60K 15/035 |
| | | 141/303 |

(Continued)

FOREIGN PATENT DOCUMENTS

| CN | 1715092 A | 1/2006 |
| CN | 102656041 A | 9/2012 |

(Continued)

OTHER PUBLICATIONS

JP 2002021667 Machine Translation.*
(Continued)

*Primary Examiner* — Ian Paquette
(74) *Attorney, Agent, or Firm* — Manabu Kanesaka (57) ABSTRACT

A valve device forming a portion of a ventilation flow channel of a fuel tank includes a float valve, a case housing the float valve, and an outside member housing the case and including an attachment portion to a fuel tank side. One portion of a cylindrical seal member fitted in a first through hole to communicate an inner portion to a second through hole is pinched between a top portion of the case wherein the first through hole is formed, and a top portion of the outside member wherein the second through hole communicating to an outside of the tank is formed, and a lower end of the cylindrical seal member becomes a valve seat of the float valve.

8 Claims, 12 Drawing Sheets

(51) Int. Cl.
*F02M 37/00* (2006.01)
*F02M 37/20* (2006.01)
*F16K 31/22* (2006.01)
*F16K 24/04* (2006.01)
*F16K 27/02* (2006.01)
*B60K 15/03* (2006.01)

(52) U.S. Cl.
CPC ........ *F02M 37/0082* (2013.01); *F02M 37/20* (2013.01); *F16K 24/044* (2013.01); *F16K 27/02* (2013.01); *F16K 31/22* (2013.01); *B60K 2015/03289* (2013.01); *B60K 2015/03467* (2013.01)

(58) Field of Classification Search
USPC ................ 137/409, 202, 43, 199, 198, 197
See application file for complete search history.

(56) References Cited

U.S. PATENT DOCUMENTS

| | | | | |
|---|---|---|---|---|
| 5,632,296 A * | 5/1997 | Kasugai | ........... | B60K 15/03519 137/43 |
| 5,725,012 A | 3/1998 | Ohsaki et al. | | |
| 5,960,816 A | 10/1999 | Mills et al. | | |
| 5,975,116 A * | 11/1999 | Rosas | ............ | B60K 15/03519 137/202 |
| 6,592,100 B2 * | 7/2003 | Chou | ............... | B60K 15/03519 137/43 |
| 6,866,058 B1 | 3/2005 | Brock et al. | | |
| 7,527,064 B2 * | 5/2009 | Kito | .......................... | F16K 1/36 137/202 |
| 7,661,193 B2 * | 2/2010 | Kishi | ................... | B29C 65/0672 228/114.5 |
| 7,770,594 B2 * | 8/2010 | Kishi | ..................... | F16K 24/044 137/202 |
| 8,186,372 B2 * | 5/2012 | Horiba | ................... | F16K 24/044 123/516 |
| 8,297,298 B2 * | 10/2012 | Matsuzaki | ........... | F16K 24/044 137/202 |
| 9,783,046 B2 | 10/2017 | Sui | | |
| 2005/0126633 A1 | 6/2005 | Leonhardt | | |
| 2006/0000091 A1 | 1/2006 | Zorine et al. | | |

FOREIGN PATENT DOCUMENTS

JP       H04-39061 Y2    9/1992
JP       2002-021667 A    1/2002

OTHER PUBLICATIONS

PCT International Search Report of PCT/JP2015/062584 dated Jul. 28, 2015.
China Patent Office, "Office Action for Chinese Patent Application No. 201580028959.9," dated Mar. 28, 2018.
Europe Patent Office, "Search Report for European Patent Application No. 15789602.8," dated Dec. 5, 2017.

\* cited by examiner

Fig. 13

VALVE DEVICE

FIELD OF TECHNOLOGY

The present invention relates to an improvement of a valve device attached to a fuel tank of an automobile, a two-wheeled vehicle, and the like for functioning for communicating inside and outside of the fuel tank in an open valve state.

BACKGROUND ART

As for the valve device forming a ventilation flow channel of the fuel tank, there is a valve device including an outer sleeve, an inner sleeve, and a float, wherein the float sits on a valve opening formed in an upper portion of the outer sleeve at an elevated position (see Patent Document 1). The outer sleeve includes a connection portion to a conductor at an upper portion of the valve opening, and there is provided a seal member for improving a seal property at a sitting time at an upper portion of the float.

As for such valve device of the Patent Document 1, in addition to the seal member, a seal member for sealing between the connection portion of the outer sleeve and the conductor is separately required.

PRIOR ART DOCUMENT

Patent Document

Patent Document 1: U.S. Pat. No. 6,866,058

SUMMARY OF THE INVENTION

Problems to be Solved by the Invention

A main object of the present invention is that in this kind of valve device, parts comprising a seal function are unified so as to minimize the number of component parts of this kind of valve device, and further reduce costs.

Means for Solving the Problems

In order to obtain the aforementioned object, the present invention is a valve device forming one portion of a ventilation flow channel of a fuel tank, including a float valve; a case housing the float valve; and an outside member housing at least an upper portion side of the case and provided with an attachment portion to a fuel tank side. Between a top portion of the case wherein a first through hole is formed, and a top portion of the outside member wherein a second through hole communicating to an outside of a tank is formed, one portion of a cylindrical seal member fitted in the first through hole to communicate an inner portion to the second through hole is pinched, and a lower end of the cylindrical seal member becomes a valve seat of the float valve.

The cylindrical seal member can seal between the top portion of the outside member and the cylindrical seal member, and between the cylindrical seal member and the top portion of the case in an airtight state. Also, in such valve device, the cylindrical seal member serves as the valve seat of the float valve as well. Thereby, parts comprising a seal function can be formed by one cylindrical seal member.

One of preferred aspects of the present invention is that one portion of the cylindrical seal member is an outer flange portion pinched between the top portion of the case and the top portion of the outside member.

Also, one of the preferred aspects of the present invention is that in either one of the case or the outside member, there is provided an engagement claw engaging an engagement hole provided in the other of the case or the outside member. In that case, furthermore, one of the preferred aspects of the present invention is that the engagement claw is provided in the top portion of the case, and the engagement hole is provided in the top portion of the outside member.

If a penetration portion is provided in the top portion of the outside member, and a penetration portion is provided in a side portion of the case, a flow channel through the penetration portions can meander up and down so as to prevent an outflow of a fuel to the outside of the tank in a state before the float valve sits onto the valve seat as much as possible.

Also, the case is formed by an outside cylinder member and an inside cylinder member combined with the outside cylinder member by forming a gap between the inside cylinder member and the outside cylinder member, and there is provided a penetration portion in a side portion of the inside cylinder member, and an upper end portion of the outside cylinder member positioned above the penetration portion becomes an open end of the gap, so that a flow channel through such open end, gap, and penetration portion can meander up and down so as to prevent the outflow of the fuel to the outside of the tank in the state before the float valve sits onto the valve seat as much as possible.

Effect of the Invention

In the valve device according to the present invention, the parts forming the seal function can be assembled with the cylindrical seal member. Therefore, the present invention can minimize the number of component parts of this kind of valve device, and further can reduce costs.

BEST MODES OF CARRYING OUT THE INVENTION

Hereinafter, typical embodiments of the present invention will be explained based on FIG. 1 to FIG. 13. A valve device according to the present embodiment is attached to a fuel tank of an automobile, a two-wheeled vehicle, and the like so as to form one portion of a ventilation flow channel 1 of such fuel tank, and functions for communicating inside and outside of the fuel tank in an open valve state (see FIGS. 4 and 11).

(First example) The valve device (the first example) shown in FIG. 1 to FIG. 8 is provided in the fuel tank using a bracket (not shown in the drawings) provided inside the fuel tank.

Figure 4:
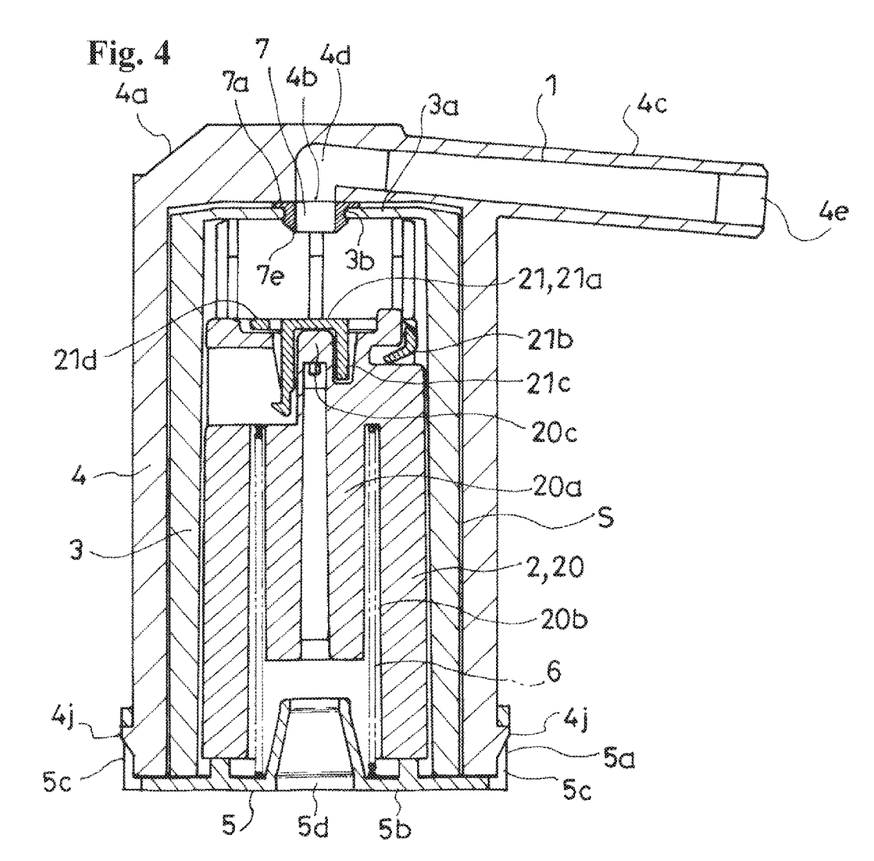
FIG. 4 is a cross-sectional view taken along a line A-A in FIG. 3, and shows an open valve state wherein a float valve is located in a lower position.
Figure 5:
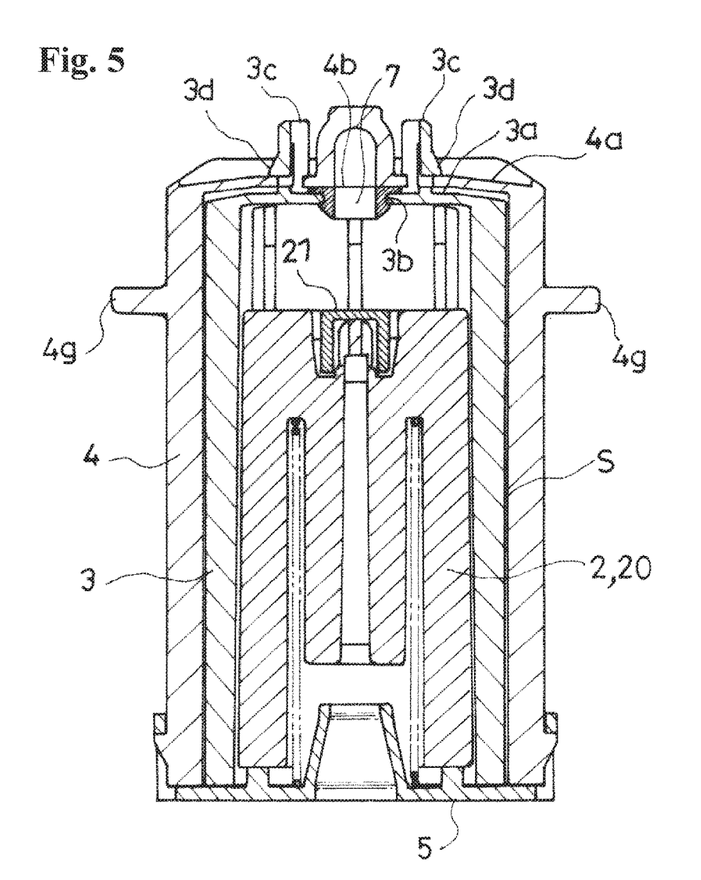
FIG. 5 is a cross-sectional view taken along a line B-B in FIG. 3, and shows the open valve state wherein the float valve is located in the lower position.
Figure 6:
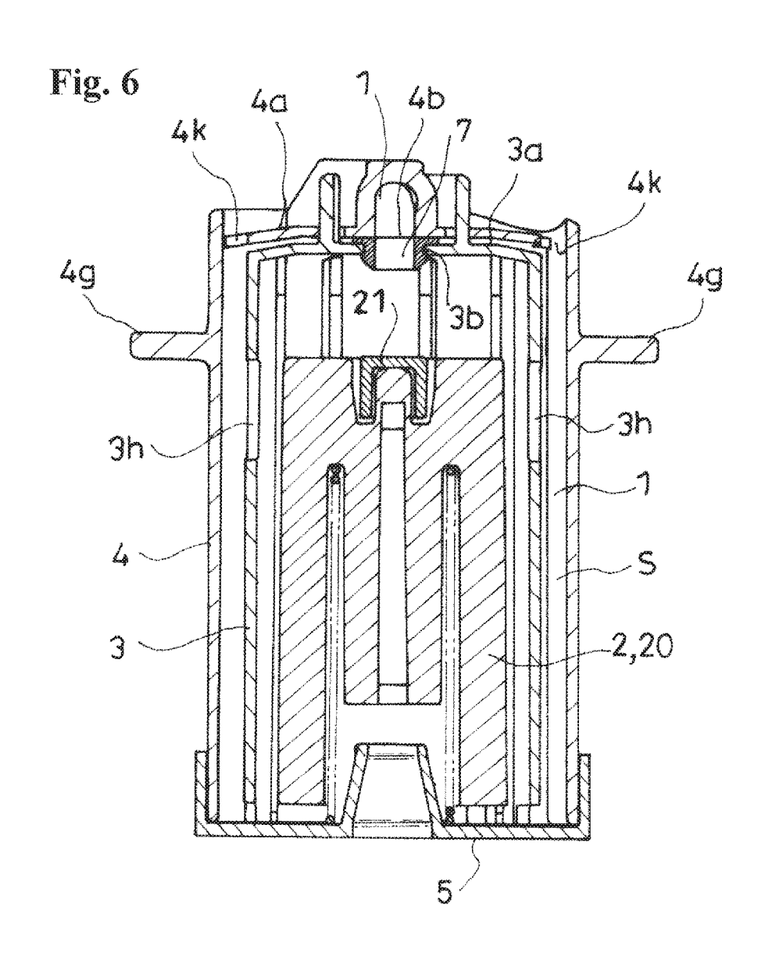
FIG. 6 a cross-sectional view taken along a line C-C in FIG. 3, and shows the open valve state wherein the float valve is located in the lower position.
Figure 7:
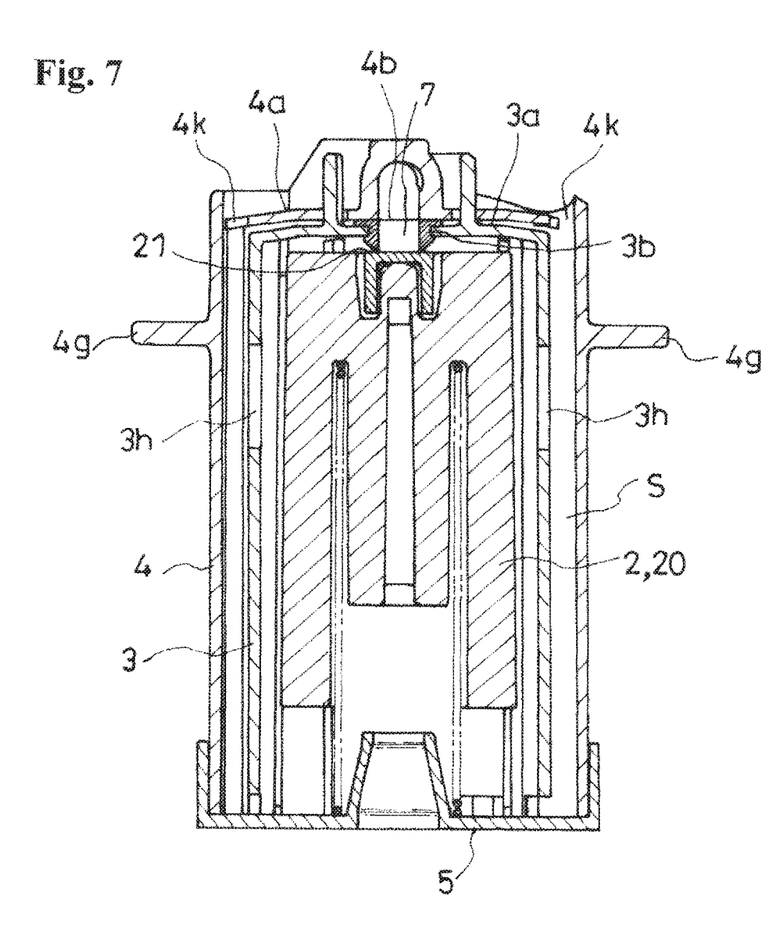
FIG. 7 is a cross-sectional view taken along the line C-C in FIG. 3, and shows a closed valve state wherein a fuel (not shown in the drawings) flows into the case so that the float valve is elevated.
Figure 8:
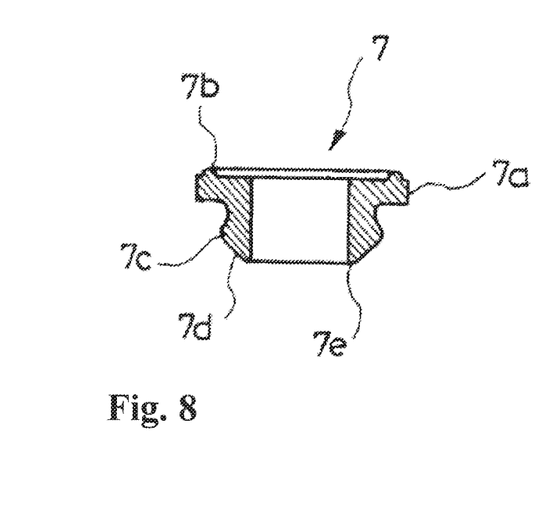
FIG. 8 is a cross-sectional view of a cylindrical seal member forming the valve device of the first example.
Figure 9:
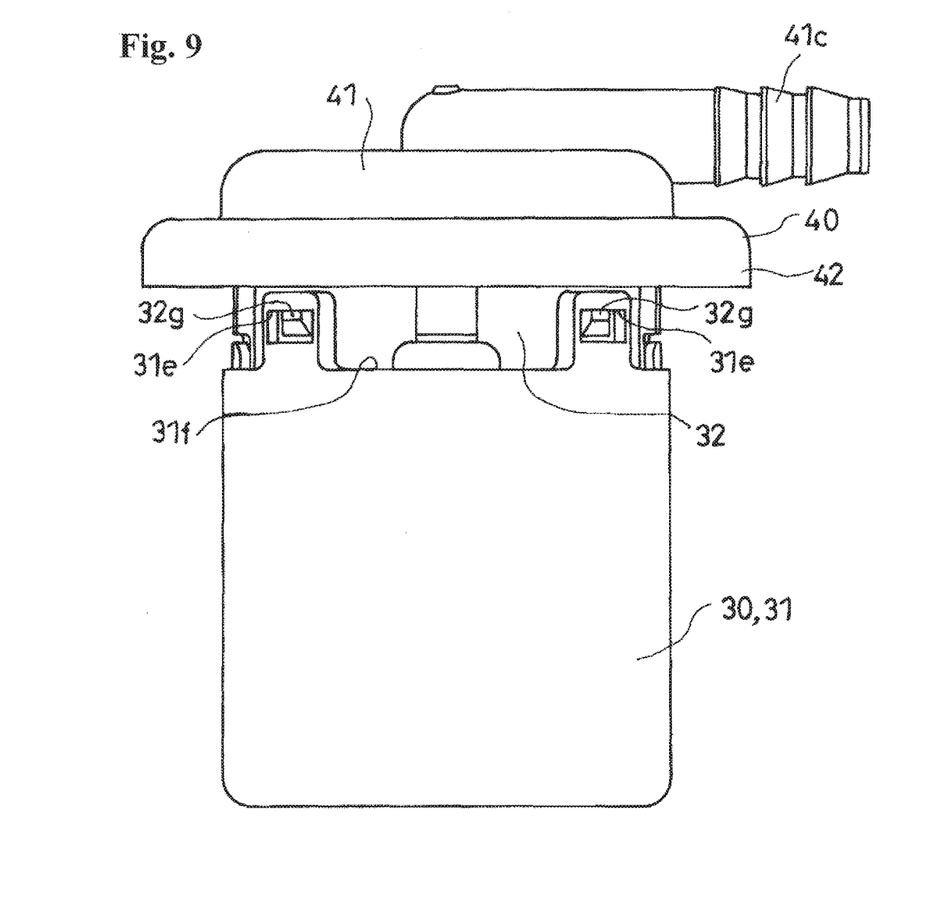
FIG. 9 is a side view of the valve device (a second example) according to one embodiment of the present invention.
Figure 10:
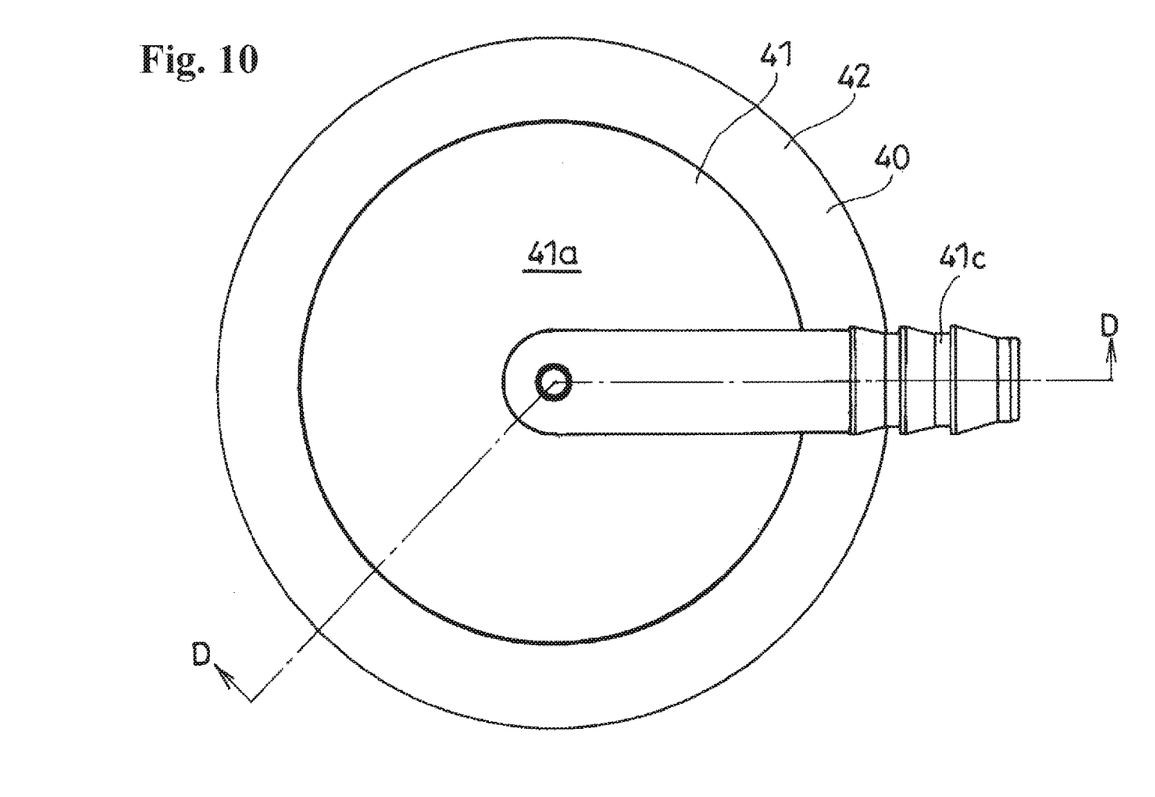
FIG. 10 is a plan view of the valve device of the second example.

Such valve device comprises a float valve 2, a case 3 housing the float valve 2, an outside member 4 housing the case 3, and a cap 5 closing a lower end of the outside member 4 (see FIG. 4). Such float valve 2, case 3, outside member 4, and cap 5 are typically made of plastic.

The case 3 includes a top portion 3a and a circular first through hole 3b at a center of the top portion 3a, and substantially has a cylindrical shape wherein a lower end is open. Also, outside the top portion 3a, there is formed a pair of plate-shaped protruding portions 3c and 3c protruding upward (see FIG. 2). The pair of plate-shaped protruding portions 3c and 3c is disposed in such a way as to face each plate face thereof, and between the pair of plate-shaped protruding portions 3c and 3c disposed in the aforementioned manner, there is formed the first through hole 3b.

On the other hand, the outside member 4 includes a top portion 4a and a circular second through hole 4b at a center of the top portion 4a, and substantially has the cylindrical shape wherein the lower end is open (see FIG. 4). Such second through hole 4b extends horizontally by integrally connecting a pipe one end 4d to the center of the top portion 4a on an upper face side of the top portion 4a of the outside member 4, and a pipe other end 4e communicates to an outside of a tank through an exhaust port 4c having a pipe shape which is a connection portion to one end of a pipe member (not shown in the drawings) forming one portion of the ventilation flow channel 1. In the top portion 4a of the outside member 4, and on both sides sandwiching the pipe one end 4d of the exhaust port 4c, there are respectively formed engagement holes 3d which can receive the plate-shaped protruding portions 3c with a small gap (see FIGS. 2 and 5). Also, between the top portion 4a and the lower end of the outside member 4, there are formed attachment portions 4g to a fuel tank side (see FIG. 2). In an illustrated example, such attachment portions 4g have a shape matching to the bracket, and are respectively provided on the right and left of the exhaust port 4c. The shape of the attachment portion 4g is accordingly changed to match to a shape of the bracket. Also, on an outer face of a side portion on a lower end side of the outside member 4, there are formed claw portions 4j.

Such case 3 and outside member 4 are combined in such a way as to pinch one portion of a cylindrical seal member 7 fitted in the first through hole 3b to communicate an inner portion to the second through hole 4b, between the top portion 3a of the case 3 wherein the first through hole 3b is formed, and the top portion 4a of the outside member 4 wherein the second through hole 4b is formed.

The cylindrical seal member 7 is made of rubber or plastic having rubber-like elasticity. In the illustrated example, such cylindrical seal member 7 includes an outer flange portion 7a having a circular shape at a cylinder upper end (see FIG. 8). On an upper face of the outer flange portion 7a, there is formed a circular projecting piece 7b. An outer diameter of the outer flange portion 7a is larger than a hole diameter of the first through hole 3b. In an outer peripheral portion of the cylindrical seal member 7, and in a position of an approximately middle in an up-and-down direction thereof, there is formed a circular rising portion 7c. Between the circular rising portion 7c and the outer flange portion 7a, there is formed an interval having a size corresponding to a thickness of the top portion 3a of the case 3. Between the circular rising portion 7c and a cylinder lower end of the cylindrical seal member 7, there is formed a circular inclined face 7d reducing an outer diameter of the cylindrical seal member 7 as coming closer to the cylinder lower end.

In the illustrated example, the cylindrical seal member 7 is fitted in the first through hole 3b from above with a cylinder lower end side thereof foremost. At a completely fitted position, the outer flange portion 7a of the cylindrical seal member 7 contacts an outer face of the top portion 3a of the case 3, and the circular rising portion 7c contacts an inner face of the top portion 3a of the case 3.

Thus, from a state wherein the cylindrical seal member 7 is fitted in the first through hole 3b, when the case 3 is entered into the outside member 4 from below such that the pair of plate-shaped protruding portions 3c and 3c formed in the top portion 3a of the case 3 respectively fits into the corresponding engagement hole 3d formed in the top portion 4a of the outside member 4, the second through hole 4b is positioned directly above the upper end of the cylindrical seal member 7, and the outer flange portion 7a of the cylindrical seal member 7 is pinched by the outer face of the top portion 3a of the case 3, and a portion which is an inner face of the top portion 4a of the outside member 4 and surrounds the second through hole 4b. Namely, in the illustrated example, one portion of the cylindrical seal member 7 pinched by the case 3 and the outside member 4 becomes the outer flange portion 7a.

In the present embodiment, a pinched state of one portion of such cylindrical seal member 7, i.e. a combined state of the case 3 and the outside member 4 is maintained by providing engagement claws 3d in either one of the case 3 or the outside member 4 to engage the engagement holes 3d provided in the other of the case 3 or the outside member 4. In the illustrated example, the engagement claws 3d are provided in the top portion 3a of the case 3, and the engagement holes 3d are provided in the top portion 4a of the outside member 4 (see FIG. 2). Such engagement claws 3d are respectively formed in the pair of plate-shaped protruding portions 3c and 3c. In each of the pair of plate-shaped protruding portions 3c and 3c, there is formed a dividing groove 3e, thereby one portion of the sectioned plate-shaped protruding portion 3c becomes an elastic piece 3f wherein an upper end is a base portion which becomes a center of an elastic deformation, and a lower end is a free end. The engagement claw 3d is formed on a side which does not face the other plate-shaped protruding portion 3c in such elastic piece 3f. Between the base portion of the elastic piece 3f and a claw tip of the engagement claw 3d, there is formed an inclined face 3g projecting outward as moving downward.

Figure 1:
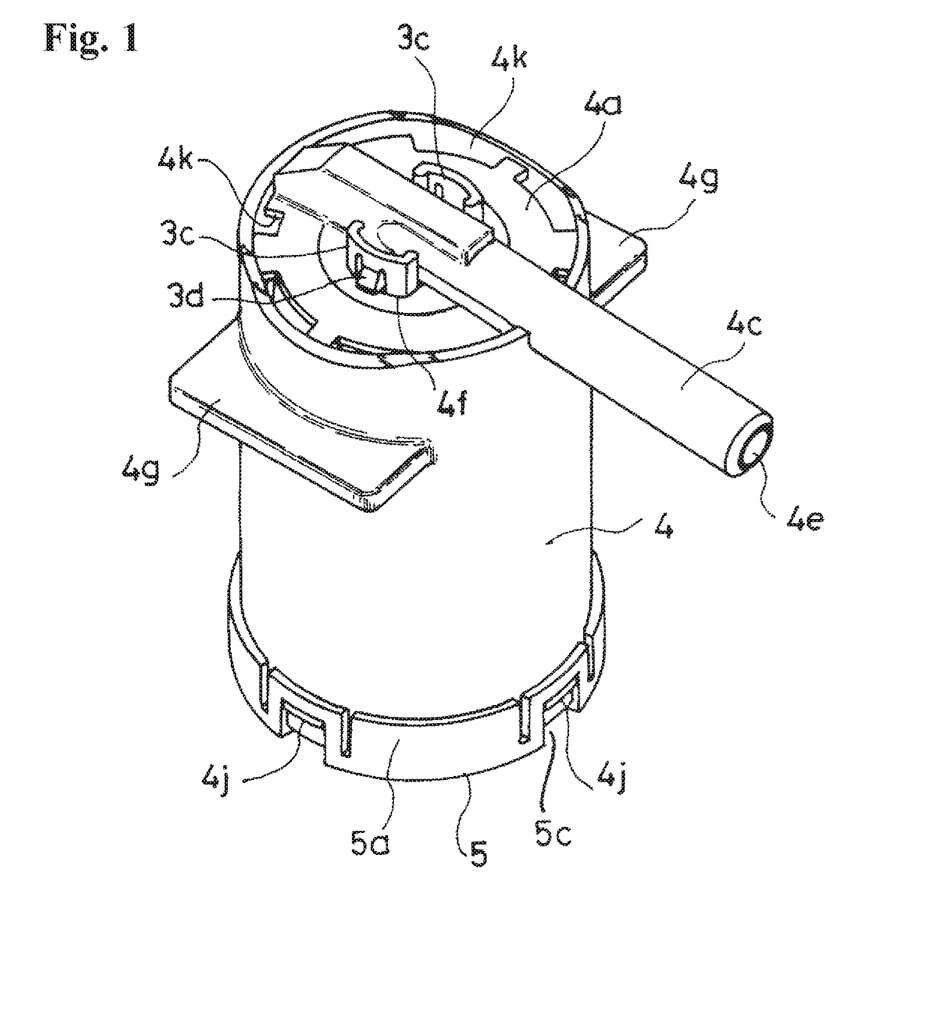
FIG. 1 is a perspective view of a valve device (the first example) according to one embodiment of the present invention.

When the case 3 is inserted into the outside member 4 as mentioned above, the plate-shaped protruding portion 3c is received in the engagement hole 3d while bending the elastic piece 3f by the inclined face 3g. In the receiving completion position, the engagement claw 3d protrudes from an outer face of the top portion 4a of the outside member 4, and elastically returns to be caught on the outer face of such top portion 4a. Thereby, the combined state of the case 3 and the outside member 4 is maintained (FIG. 1).

An inner diameter of the outside member 4 is larger than an outer diameter of the case 3, and between a side portion of the outside member 4 and a side portion of the case 3 combined as mentioned above, there is formed a gap S forming one portion of the ventilation flow channel 1 over an entire circumference (see FIG. 4).

The float valve 2 comprises a float main member 20 and a valve member 21 tiltably provided at an upper portion of the float main member 20.

In the illustrated example, the float main member 20 includes an annular space 20b substantially closing an upper end and internally surrounding a core portion 20a, and has a cylinder shape opening the annular space 20b on a lower end side. In the annular space 20b, there is housed a compression coil spring 6 wherein a spring upper end abuts against an inner back portion of the annular space 20b, and a spring lower end abuts against a bottom plate 5b of the cap 5 to always apply a certain amount of urging forces upward relative to the float valve 2.

The valve member 21 includes following respective portions (1) to (4) (see FIG. 4).

(1) A seal portion 21a closing the first through hole 3b at a time of a rise of the float valve 2.

(2) A catching portion 21b caught on one portion of the float main member 20 and becoming a center of the tilting.

(3) An abutment portion 21c protruding on a back side of the seal portion 21a.

(4) A support point portion 21d abutting against the lower end of the cylindrical seal member 7 at a time of the tilting.

Then, in the valve device according to the present embodiment, the abutment portion 21c abuts against an abutted portion 20c formed in the upper portion of the float main member 20 by the tilting to thereby move the valve member 21 in a horizontal direction.

The cap 5 comprises a short cylindrical portion 5a having an inner diameter approximately equal to an outer diameter of the lower end of the outside member 4, and the bottom plate 5b closing a cylinder lower end of the short cylindrical portion 5a (see FIGS. 1 and 4). After the float valve 2 is housed below the top portion 3a of the case 3 combined with the outside member 4 as mentioned above, when the lower end side of the outside member 4 is completely entered into the cap 5, the claw portion 4j formed in the outside member 4 is engaged with an engagement window 5c formed in the short cylindrical portion 5a of the cap 5, and the lower ends of the outside member 4 and the case 3 are closed by such cap 5, so that the float valve 2 located in a lower position is supported by the bottom plate 5b of the cap 5. At a center of the bottom plate 5b of such cap 5, there is formed a penetration portion 5d (see FIG. 4).

As mentioned above, the float valve 2, the case 3, the outside member 4, and the cap 5 are combined so as to form the valve device. In such valve device, the lower end of the cylindrical seal member 7 protruding downward from the inner face of the top portion 3a of the case 3 becomes a valve seat 7e of the float valve 2.

Figure 2:
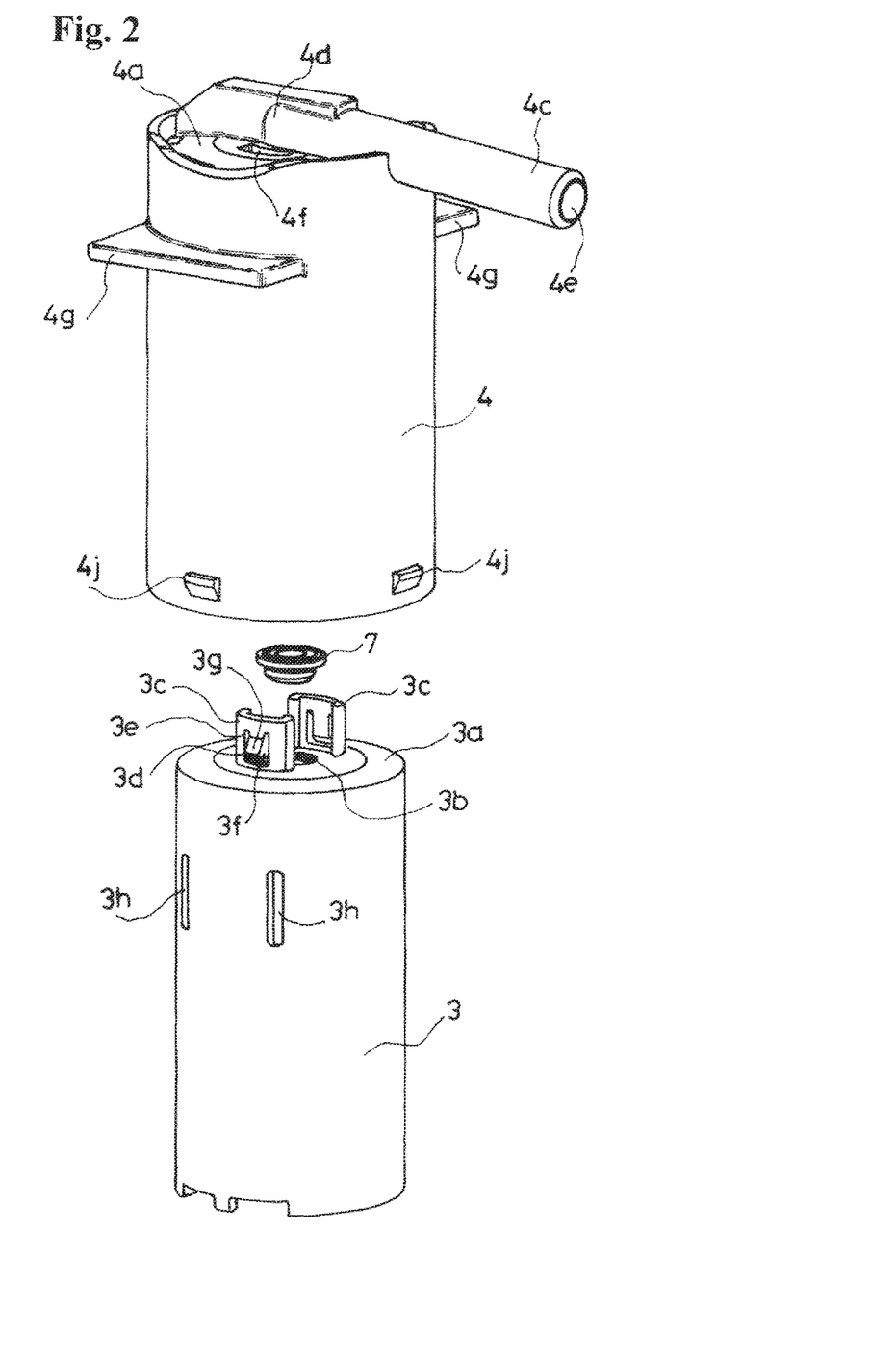
FIG. 2 is a perspective view showing a state wherein an outside member and a case forming the valve device of the first example are separated.
Figure 3:
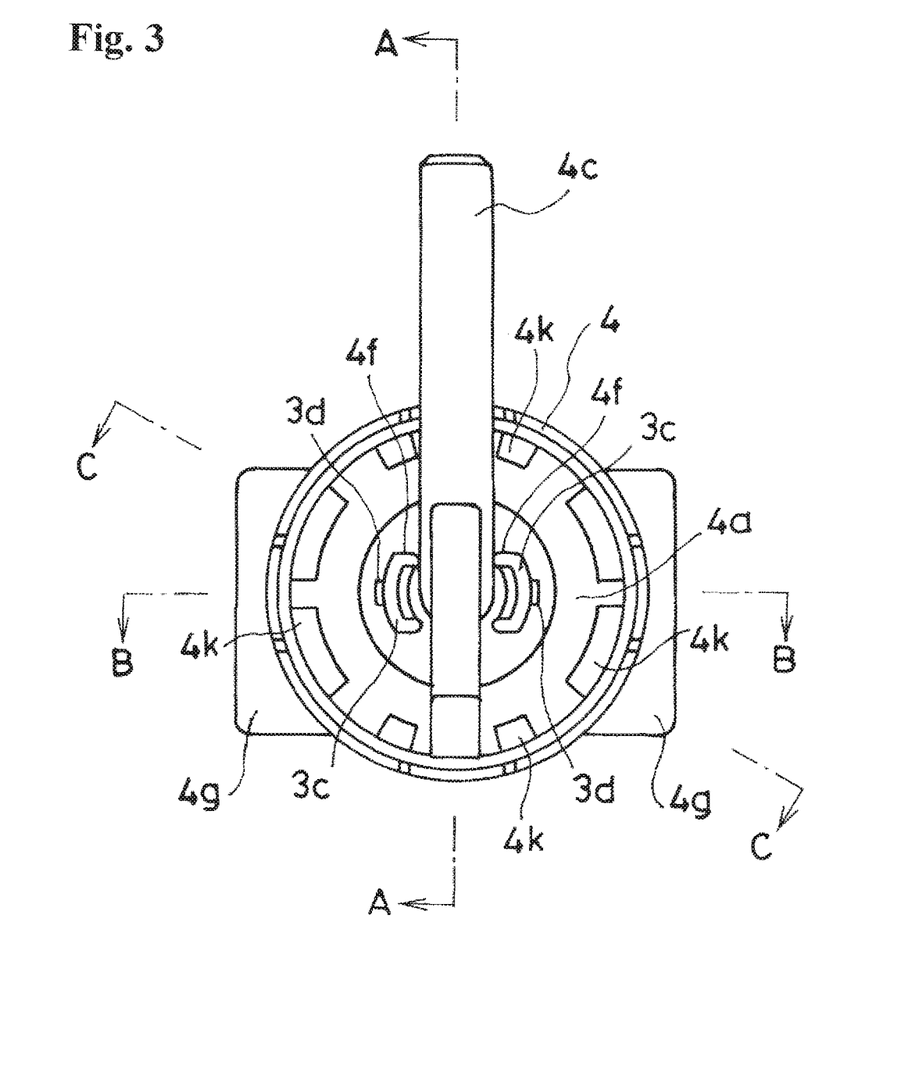
FIG. 3 is a plan view of the valve device of the first example.

Also, in the present embodiment, penetration portions 4k are provided in the top portion 4a of the outside member 4 (see FIG. 1.), and penetration portions 3h are provided in the side portion of the case 3 (see FIG. 2). A plurality of penetration portions 4k of the outside member 4 is formed in an outer peripheral portion of the top portion 4a of the outside member 4. Each penetration portion 4k of the outside member 4 has a long hole shape long in a circumferential direction of the outside member 4 respectively communicating to the aforementioned gap S between the outside member 4 and the case 3. A plurality of penetration portions 3h of the case 3 is formed in the side portion of the case 3. Each penetration portion 3h of the case 3 has a long hole shape long in an up-and-down direction.

When the float valve 2 is located in the lower position wherein a lower end thereof contacts the cap 5, inside and outside of the tank can communicate through the penetration portions 4k of the outside member 4, the penetration portions 3h of the case 3, the cylindrical seal member 7, the second through hole 4b, and the exhaust port 4c. The penetration portions 4k of the outside member 4 are formed in the top portion 4a thereof, and the penetration portions 3h of the case are formed in the side portion thereof, so that a flow channel through the penetration portions 3h and 4k meanders up and down so as to prevent an outflow of a fuel to the outside of the tank in a state before the float valve 2 sits onto the valve seat 7e as low as possible. When the fuel flows into the case 3, the float valve 2 rises up to a position wherein the valve member 21 provided on the upper portion thereof sits on the valve seat 7e, as the cylinder lower end of the cylindrical seal member 7 facing inside the case 3 is regarded as the valve seat 7e. Thereby, the aforementioned communication of the inside and outside of the tank is blocked. When the fuel flows out of the case 3, the float valve 2 lowers again, so that the inside and outside of the tank can communicate again through the valve device.

In the valve device according to the present embodiment, the cylindrical seal member 7 can seal between the top portion 4a of the outside member 4 and the cylindrical seal member 7, and between the cylindrical seal member 7 and the top portion 3a of the case 3 in an airtight state. In the illustrated example, due to the pinching, in an elastically deformed state, the outer flange portion 7a of the cylindrical seal member 7 is pressed against a hole edge portion of the second through hole 4b of the top portion 4a of the outside member 4 and a hole edge portion of the first through hole 3b of the top portion 3a of the case 3, and a ventilation between the valve device and the outside of the tank is carried out only through the inner portion of the cylindrical seal member 7. Also, in the valve device according to the present embodiment, the cylindrical seal member 7 serves as the valve seat 7e of the float valve 2 as well. Thereby, in the valve device according to the present embodiment, parts comprising a seal function can be formed by one cylindrical seal member 7 so as to minimize the number of component parts of this kind of valve device, and further reduce costs.

When the fuel flows into the case 3, the seal portion 21a of the valve member 21 of the float valve 2 rising by the aforementioned flowing blocks the lower end of the cylindrical seal member 7, i.e. the valve seat 7e so as to prevent the fuel from flowing to the outside of the tank. While the float valve 2 can move down when the fuel flows out of the case 3, since the float main member 20 and the valve member 21 are linked on the catching portion 21b side, and are not linked on a support point portion 21d side, in the valve member 21, the support point portion 21d abuts against the lower end of the cylindrical seal member 7 to tilt such that the catching portion 21b side becomes an inclined bottom as a support point of the aforementioned abutting portion. Therewith, while the valve member 21 contacts the abutment portion 21c against the abutted portion 20c by the aforementioned tilting, since a position in the horizontal direction of the abutted portion 20c does not change, the valve member 21 moves in the horizontal direction while tilting as mentioned above. Thereby, even in a case wherein the inside of the tank has a high pressure, and in a case wherein the cylindrical seal member 7 and the seal portion 21a are made of a material which can be easily attached, a separation between the cylindrical seal member 7 and the seal portion 21a, i.e. a smooth opening of the valve device can be provided.

(Second example)

Figure 11:
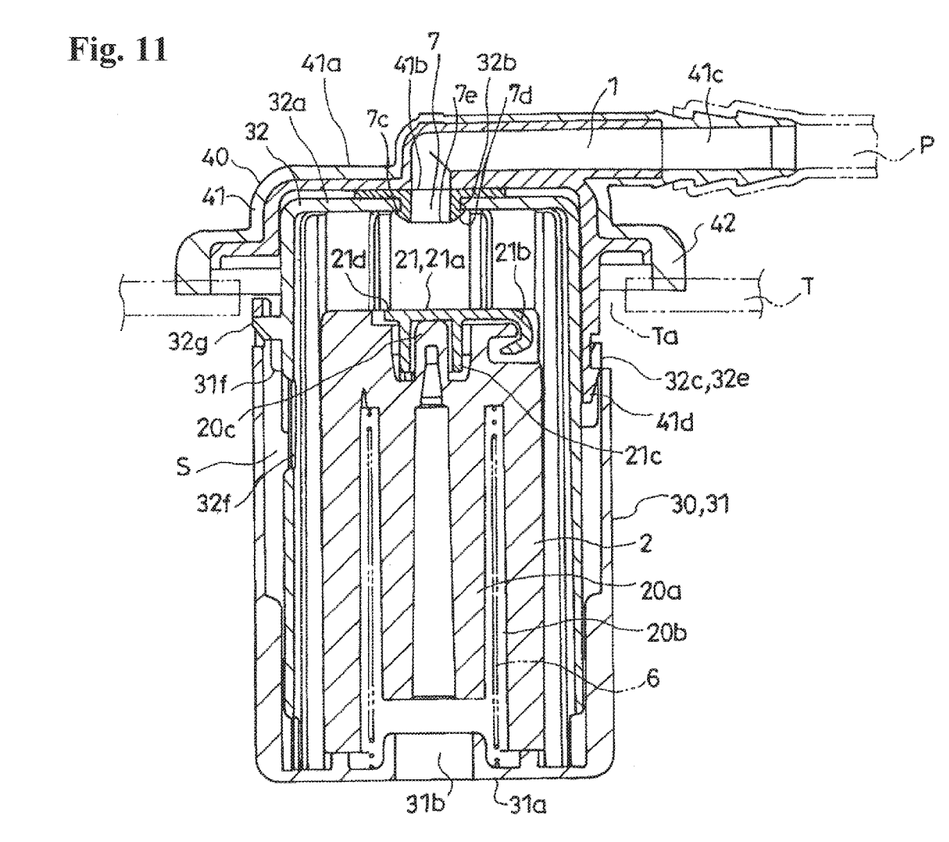
FIG. 11 is a cross-sectional view taken along a line D-D in FIG. 10, and shows the open valve state wherein the float valve is located in the lower position.

The valve device (a second example) shown in FIG. 9 to FIG. 13 is attached to an upper portion of a fuel tank T. The valve device comprises an outside member 40 having a size of blocking an attachment hole Ta formed on the upper portion of the fuel tank T; and a case 30 which can be inserted into the fuel tank T through the attachment hole Ta, and in a state wherein such case 30 is inserted into the fuel tank T, an outer peripheral portion of the outside member 40 is fixed on an outer face of the upper portion of the fuel tank T by welding and the like so as to be provided in the fuel tank T (FIG. 11).

Such valve device comprises the float valve 2, the case 30 housing the float valve 2, and the outside member 40 housing an upper portion side of the case 30. Such float valve 2, case 30, and outside member 40 are typically made of plastic.

The case 30 is formed by an outside cylinder member 31, and an inside cylinder member 32 combined with the outside cylinder member 31 by forming a gap S between the inside cylinder member 32 and the outside cylinder member 31.

Figure 12:
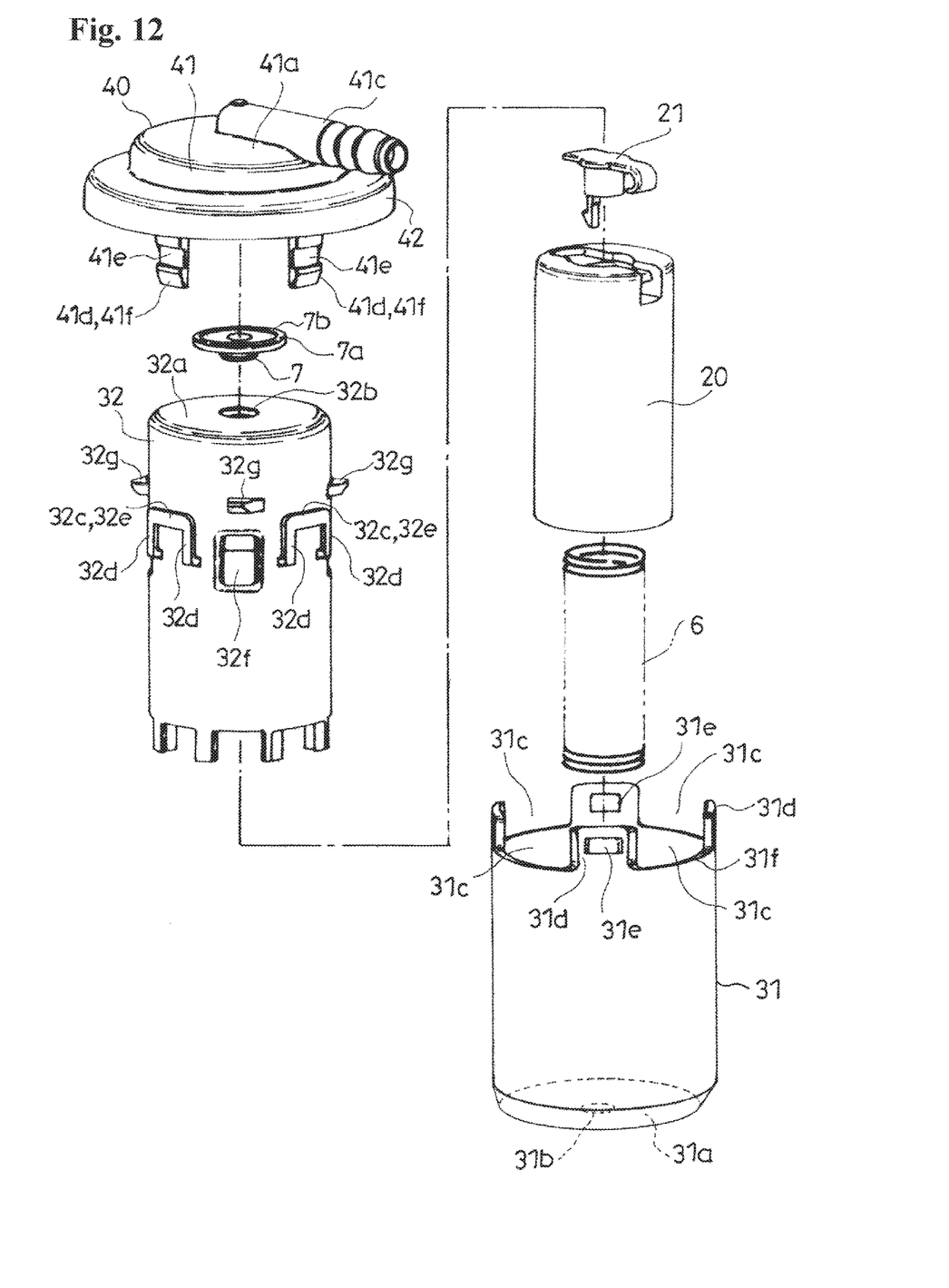
FIG. 12 is an exploded perspective view of the valve device of the second example.
Figure 13:
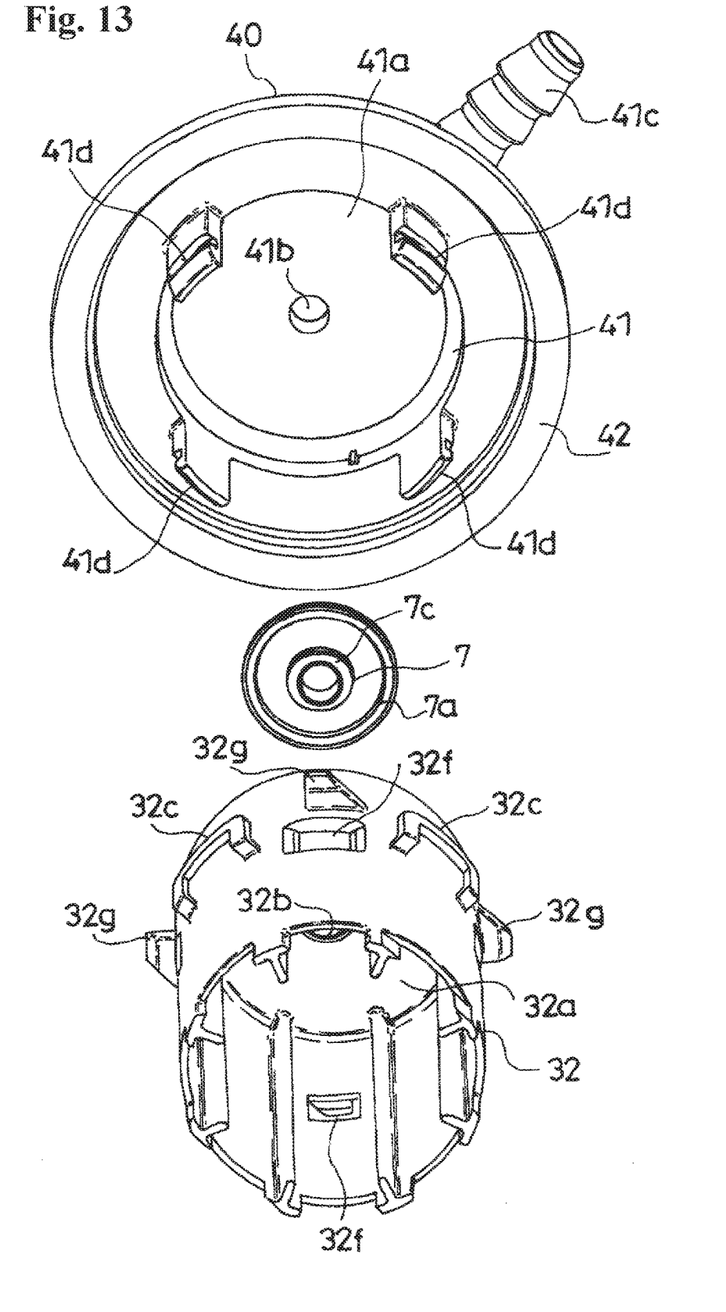
FIG. 13 is a perspective view showing a state wherein the outside member forming the valve device of the second example and an inside cylindrical member forming the case are separated.

The outside cylinder member 31 includes a bottom portion 31a, and a circular through hole 31b at a center of the bottom portion 31a, and substantially has a cylindrical shape wherein an upper end is open (see FIG. 12). In an upper end portion of the outside cylinder member 31, there is formed a plurality of concave notch portions 31c, 31c ... with intervals in a direction of surrounding a cylinder shaft of the outside cylinder member 31, and the upper end portion of the outside cylinder member 31 has a crown shape. In a projecting-piece-like portion 31d remaining between adjacent concave notch portions 31c and 31c of the outside cylinder member 31, there is formed an engagement window 31e.

On the other hand, the inside cylinder member 32 includes a top portion 32a and a circular first through hole 32b at a center of the top portion 32a, and substantially has a cylindrical shape wherein a lower end is open (see FIG. 12). In a side portion of the inside cylinder member 32, there are formed engaged portions 32c relative to engagement portions 41d of the outside member 40, penetration portions 32f, and engagement projections 33g relative to the engagement windows 31e of the outside cylinder member 31.

In the illustrated example, four engaged portions 32c are provided with an interval between adjacent engaged portions 32c in a direction of surrounding a cylinder shaft of the inside cylinder member 32. In each engaged portion 32c, a lower end is integrally connected to an outer face of the inside cylinder member 32, and the engaged portion 32c respectively comprises a pair of arm portions 32d and 32d extending upward with a gap between the pair of arm portions 32d and 32d and the outer face of the inside cylinder member 32; and bridge portions 32e ranging between upper ends of the pair of arm portions 32d and 32d.

In the illustrated example, the penetration portions 32f are a square-shaped hole penetrating inside and outside of the inside cylinder member 32, and respectively formed between the adjacent engaged portions 32c and 32c.

In the illustrated example, the engagement projections 33g project from the outer face of the inside cylinder member 32, and are respectively provided directly above the penetration portions 32f.

On the other hand, in the illustrated example, the outside member 40 comprises a short cylindrical portion 41 wherein an upper end is closed and a lower end is open; and a flange portion 42 projecting outward from the lower end of the short cylindrical portion 41 (see FIG. 12).

The short cylindrical portion 41 includes the upper end, i.e. a top portion 41a, and a circular second through hole 41b at a center of the top portion 41a (see FIG. 11). Such second through hole 41b extends horizontally by integrally connecting a pipe one end to a center of the top portion 41b on an upper face side of the top portion 41b of the outside member 40, and a pipe other end communicates to the outside of the tank through an exhaust port 41c having a pipe shape which is a connection portion to one end of a pipe member P forming one portion of the ventilation flow channel 1.

In the lower end of the short cylindrical portion 41 of the outside member 40, there are formed the engagement portions 41d formed by elastic pieces 41e projecting downward by integrally connecting the upper end to the lower end of the short cylindrical portion 41, and projections 41f formed on a lower end outer side of the elastic pieces 41e. In the illustrated example, four engagement portions 41d are provided corresponding to the engaged portions 32c with an interval between adjacent engagement portions 41d in a direction of surrounding a cylinder shaft of the short cylindrical portion 41 of the outside member 40.

The outside cylinder member 31 and the inside cylinder member 32 are combined such that the inside cylinder member 32 is inserted into the outside cylinder member 31 from an upper end side of the outside cylinder member 31 with the lower end of the inside cylinder member 32 foremost up to a position wherein the lower end of the inside cylinder member 32 hits the bottom portion 31a of the outside cylinder member 31. In such insertion process, each projecting-piece-like portion 31d respectively abuts against the corresponding engagement projection 33g positioned directly above the penetration portion 32f positioned between the adjacent engaged portions 32c and 32c so as to elastically deform outward, and at a position wherein the inside cylinder member 32 is completely inserted, the projecting-piece-like portion 31d elastically returns to receive the engagement projection 33g into the engagement window 31e to be engaged.

Between the outside cylinder member 31 and the inside cylinder member 32 combined as above, there is formed the gap S in such a way as to surround a cylinder shaft of the case 30. Also, an upper end portion 31f (a level of a base portion of the projecting-piece-like portion 31d) of the outside cylinder member 31 is positioned below an upper end of the inside cylinder member 32 and above the penetration portion 32f. Therewith, the gap S and an outside of the case 30 are communicated as an open end of the upper end portion 31f of the outside cylinder member 31.

The case 30 and the outside member 40 formed as above are combined in such a way as to pinch one portion of the cylindrical seal member 7 fitted in the first through hole 32b to communicate the inner portion to the second through hole 41b, between the top portion 32a of the inside cylinder member 32 forming the case 30 wherein the first through hole 32b is formed, and the top portion 41a of the outside member 40 wherein the second through hole 41b is formed.

The cylindrical seal member 7 is made of rubber or plastic having the rubber-like elasticity as with the first example. In the illustrated example, such cylindrical seal member 7 includes the outer flange portion 7a having the circular shape at the cylinder upper end (see FIG. 12). On the upper face of the outer flange portion 7a, there is formed the circular projecting piece 7b. The outer diameter of the outer flange portion 7a is larger than a hole diameter of the first through hole 32b. In the outer peripheral portion of the cylindrical seal member 7, and in the position of the approximately middle in the up-and-down direction thereof, there is formed the circular rising portion 7c (see FIG. 13). Between the circular rising portion 7c and the outer flange portion 7a, there is formed an interval having a size corresponding to a thickness of the top portion 32a of the inside cylinder member 32 forming the case 30 (see FIG. 11). Between the circular rising portion 7c and the cylinder lower end of the cylindrical seal member 7, there is formed the circular inclined face 7d reducing the outer diameter of the cylindrical seal member 7 as coming closer to the cylinder lower end.

In the illustrated example, the cylindrical seal member 7 is fitted in the first through hole 32b from above with the cylinder lower end side thereof foremost. At a completely fitted position, the outer flange portion 7a of the cylindrical seal member 7 contacts an outer face of the top portion 32a of the inside cylinder member 32 forming the case 30, and the circular rising portion 7c contacts an inner face of the top portion 32a of such inside cylinder member 32.

Thus, from a state wherein the cylindrical seal member 7 is fitted in the first through hole 32b, when an upper end side of the inside cylinder member 32 is entered into the short cylindrical portion 41 of the outside member 40 from below such that the engagement portion 41d of the outside member 40 enters into the inside of each engaged portion 32c of the inside cylinder member 32 forming the case 30 respectively, the second through hole 41b is positioned directly above the upper end of the cylindrical seal member 7, and the outer flange portion 7a of the cylindrical seal member 7 is pinched by the outer face of the top portion 32a of the inside cylinder member 32 forming the case 30, and a portion which is an inner face of the top portion 41a of the outside member 40 and surrounds the second through hole 41b. Namely, in the illustrated example, one portion of the cylindrical seal member 7 pinched between the case 30 and the outside member 40 becomes the outer flange portion 7a.

In the present embodiment, a pinched state of one portion of such cylindrical seal member 7, i.e. a combined state of the case 30 and the outside member 40, is maintained by engaging the engagement portion 41d with the engaged portion 32c. When the case 30 enters the outside member 40 as mentioned above, the projection 41f abuts against the bridge portion 32e of the engaged portion 32c, and the elastic piece 41e and the arm portion 32d elastically deform to allow the case 30 to enter into the outside member 40, and when the case is completely entered into the outside member 40, the projection 41f enters below the bridge portion 32e, and the elastic piece 41e and the arm portion 32d elastically return so that the projection 41f is caught on the bridge portion 32e. Thereby, the combined state of the case 30 and the outside member 40 is maintained (see FIG. 11).

The float valve 2 and the spring 6 of the second example substantially have the structure same as the float valve 2 and the spring 6 of the first example, and prior to assemble the outside cylinder member 31 and the inside cylinder member 32 as mentioned above, the float valve 2 and the spring 6 of the second example are housed inside the inside cylinder member 32. Regarding explanations of such float valve 2 and spring 6, the symbols same as the float valve 2 and the spring 6 in the drawings showing the first example are assigned to the float valve 2 and the spring 6 in the drawings showing the second example, and their explanations are omitted.

Thus, the case 30 wherein the float valve 2 and the spring 6 are housed is combined with the outside member 40 to form the valve device. In such valve device, the lower end of the cylindrical seal member 7 protruding downward from the inner face of the top portion 32a of the inside cylinder member 32 forming the case 3 becomes the valve seat 7e of the float valve 2.

When the float valve 2 is located in the lower position wherein the lower end thereof contacts a bottom portion of the inside cylinder member 32, the inside and outside of the tank can communicate through the open end (the upper end portion 31f of the outside cylinder member 31) of the gap S, the penetration portion 32f of the inside cylinder member 32, the cylindrical seal member 7, the second through hole 41b, and the exhaust port 41c. The open end (the upper end portion 31f of the outside cylinder member 31) is positioned above the penetration portion 32f of the inside cylinder member 32, and the penetration portion 32f of the inside cylinder member 32 is formed in the side portion of the inside cylinder member 32, so that a flow channel through such open end (the upper end portion 31f of the outside cylinder member 31), the gap S, and the penetration portion 32f meanders up and down so as to prevent the outflow of the fuel to the outside of the tank in the state before the float valve 2 sits onto the valve seat 7e as much as possible. When the fuel flows into the case 30 through the through hole 31b of the bottom portion 31a of the outside cylinder member 31, the float valve 2 rises up to the position wherein the valve member 21 provided on the upper portion thereof sits on the valve seat 7e as the cylinder lower end of the cylindrical seal member 7 facing inside the case 30 as the valve seat 7e. Thereby, the aforementioned communication of the inside and outside of the tank is blocked. When the fuel flows out of the case 30, the float valve 2 lowers again, so that the inside and outside of the tank can communicate again through the valve device.

In the valve device according to the present embodiment, the cylindrical seal member 7 can seal between the top portion 41a of the outside member 40 and the cylindrical seal member 7, and between the cylindrical seal member 7 and the top portion 32a of the inside cylinder member 32 forming the case 30 in the airtight state. In the illustrated example, due to the pinching, in the elastically deformed state, the outer flange portion 7a of the cylindrical seal member 7 is pressed against a hole edge portion of the second through hole 41b of the top portion 41a of the outside member 40 and a hole edge portion of the first through hole 32b of the top portion 32a of the inside cylinder member 32 forming the case 30, and the ventilation between the valve device and the outside of the tank is carried out only through the inner portion of the cylindrical seal member 7. Also, in the valve device according to the present embodiment, the cylindrical seal member 7 serves as the valve seat 7e of the float valve 2 as well. Thereby, in the valve device according to the present embodiment, the parts comprising the seal function can be formed by one cylindrical seal member 7 so as to minimize the number of the component parts of this kind of valve device, and further reduce costs.

Incidentally, obviously, the present invention is not limited to the embodiment explained hereinabove, and includes all embodiments which can obtain the object of the present invention.

EXPLANATION OF SYMBOLS 1 a ventilation flow channel
2 a float valve
3 a case
3a a top portion
3b a first through hole
4 an outside member
4a a top portion
4b a second through hole
4g an attachment portion
7 a cylindrical seal member
7e a valve seat Incidentally, all contents of the specifications, claims, drawings, and abstracts of Japanese Patent Applications No. 2014-097413 filed on May 9, 2014 and No. 2015-006043 filed on Jan. 15, 2015 are cited in their entireties herein and are incorporated as a disclosure of the specification of the present invention.

What is claimed is:

1. A valve device forming a portion of a ventilation flow channel of a fuel tank, comprising:
    a float valve;
    a case housing the float valve, and including a first through hole on a top portion of the case;
    an outside member housing at least the top portion of the case and including
        an attachment portion to a fuel tank, and
        a second through hole on a top portion of the outside member to communicate an inside of the tank to an outside of the tank; and
    a cylindrical seal member fitted in the first through hole and including
        an inner portion to communicate with the second through hole,
        an outer flange portion formed at an upper end of the cylindrical seal member and having an outer diameter greater than a diameter of the first through hole, the outer flange portion being pinched between the top portion of the case and the top portion of the outside member,
        a lower end of the cylindrical seal member, which becomes a valve seat of the float valve,
        a circular rising portion arranged between the outer flange portion and the lower end, the circular rising portion having a diameter greater than that of the lower end and less than that of the outer flange portion, and
        an interval between the outer flange portion and the circular rising portion has a diameter less than that of the circular rising portion so that the top portion of the case is sandwiched between the outer flange portion and the circular rising portion to attach the cylindrical seal member to the case.

2. A valve device according to claim 1, wherein a penetration portion is provided in the top portion of the outside member, and a penetration portion is provided in a side portion of the case.

3. A valve device according to claim 1,
    wherein the case includes
        an outside cylinder member and
        an inside cylinder member combined with the outside cylinder member to have a gap between the inside cylinder member and the outside cylinder member,
    a penetration portion is formed in a side portion of the inside cylinder member, and
    an upper end portion of the outside cylinder member positioned above the penetration portion has an opening to communicate the gap to an outside of the case.

4. A valve device according to claim 1, wherein either one of the case or the outside member includes an engagement claw engaging an engagement hole provided in the other of the case or the outside member.

5. A valve device according to claim 4, wherein the engagement claw is provided in the top portion of the case, and the engagement hole is provided in the top portion of the outside member.

6. A valve device according to claim 1, wherein the cylindrical seal member further comprises a circular projecting piece on an upper face of the outer flange portion contacting the top portion of the outside member.

7. A valve device according to claim 6, wherein the cylindrical seal member further comprises a circular inclined face between the circular rising portion and the lower end so that an outer diameter of the cylindrical seal member gradually increases from the lower end toward the circular rising portion.

8. A valve device according to claim 7, wherein the outside member houses the case with a gap formed therebetween,
    the top portion of the outside member includes a first hole communicating with the gap, and
    a side portion of the case includes a second hole communicating with the gap so that the flow channel is formed for communicating the inside of the tank to the outside of the tank through the first hole, the second hole, the inner portion of the cylindrical seal member, and the second through hole.

* * * * *